US011436635B2

United States Patent
Candiotti (10) Patent No.: US 11,436,635 B2
(45) Date of Patent: *Sep. 6, 2022

(54) DIGITAL CONTENT DELIVERY BASED ON MEASURED VIEWABILITY OF A DISPLAYED CONTENT INSERTION FIELD

(71) Applicant: Optimera, LLC, Brooklyn, NY (US)

(72) Inventor: Keith Candiotti, Brooklyn, NY (US)

(73) Assignee: Optimera, LLC, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/851,560

(22) Filed: Apr. 17, 2020

(65) Prior Publication Data

US 2020/0250701 A1 Aug. 6, 2020

Related U.S. Application Data

(63) Continuation of application No. 16/190,246, filed on Nov. 14, 2018, now Pat. No. 10,664,867, which is a continuation-in-part of application No. 15/634,294, filed on Jun. 27, 2017, now Pat. No. 10,643,254.

(60) Provisional application No. 62/355,487, filed on Jun. 28, 2016.

(51) Int. Cl.
*G06Q 30/02* (2012.01)

(52) U.S. Cl.
CPC ..... *G06Q 30/0254* (2013.01); *G06Q 30/0272* (2013.01); *G06Q 30/0277* (2013.01)

(58) Field of Classification Search
CPC ........... G06Q 30/0254; G06Q 30/0272; G06Q 30/0277
See application file for complete search history.

(56) References Cited

U.S. PATENT DOCUMENTS

| | | | |
|---|---|---|---|
| 9,661,360 B2 | 5/2017 | Geller et al. | |
| 9,706,231 B2 | 7/2017 | Geller et al. | |
| 2010/0191574 A1 | 7/2010 | Ziemann | |
| 2011/0029377 A1 | 2/2011 | Chen et al. | |
| 2013/0185164 A1* | 7/2013 | Pottjegort | G06Q 30/02 705/14.73 |
| 2013/0268351 A1 | 10/2013 | Abraham et al. | |
| 2014/0129352 A1* | 5/2014 | Ringdahl | G06Q 30/0275 705/14.71 |
| 2014/0129952 A1 | 5/2014 | Van Valen, III | |
| 2014/0229268 A1 | 8/2014 | Clapp et al. | |
| 2014/0281901 A1 | 9/2014 | Mostowy et al. | |
| 2014/0297400 A1 | 10/2014 | Sandholm | |

(Continued)

OTHER PUBLICATIONS

Wang, C., Kalra, A., Borcea, C., & Chen, Y, Viewability Prediction for Online Display Ads, Proceedings of the 24th acm international on conference on information and knowledge management (pp. 413-422). (Year: 2015).*

*Primary Examiner* — E Carvalho
(74) *Attorney, Agent, or Firm* — Fox Rothschild LLP (57) ABSTRACT

When a server serves web pages and/or software application pages with digital ads to client devices, a system determines viewability scores for individual ad insertion spaces on the pages. The system determines viewability scores for each field based on the time at which at least a threshold percentage or ratio of the field's pixels where viewable and not off-screen or obscured by another open window. The system or the server may then select digital ads to serve to each field based on the field's viewability score.

21 Claims, 5 Drawing Sheets

(56) References Cited

U.S. PATENT DOCUMENTS

| 2015/0058114 | A1  | 2/2015  | Yi            |            |
|--------------|-----|---------|---------------|------------|
| 2016/0125453 | A1  | 5/2016  | Shukla et al. |            |
| 2017/0140437 | A1* | 5/2017  | Bhat          | H04L 67/20 |
| 2017/0199888 | A1* | 7/2017  | Toksoz        | G06Q 30/0241 |
| 2017/0228762 | A1* | 8/2017  | Riviello      | G06Q 30/0277 |
| 2017/0358009 | A1* | 12/2017 | Shah          | G06Q 30/0264 |

* cited by examiner

DIGITAL CONTENT DELIVERY BASED ON MEASURED VIEWABILITY OF A DISPLAYED CONTENT INSERTION FIELD

RELATED APPLICATIONS AND CLAIM OF PRIORITY

This patent document is a continuation of U.S. patent application Ser. No. 16/190,246 filed Nov. 14, 2018, which is a continuation-in-part of U.S. patent application Ser. No. 15/634,294 filed Jun. 27, 2017, which in turn claims priority to U.S. Provisional Patent Application No. 62/355,487 filed Jun. 28, 2016. The disclosures of the priority applications are fully incorporated into this document by reference.

BACKGROUND

When an advertiser provides a digital advertising plan (sometimes referred to as a campaign) to a digital content publisher, it is becoming more likely that the advertiser will request that a certain threshold of viewability is met during execution of the campaign. For example, an advertiser may request that when an ad runs on a publisher's website, it be viewable for 70% of the instances in which ads are shown. If the media campaign is called to deliver an ad 100,000 times (also known as ad impressions), the expectation would be that 70,000 of those ad impressions meet the viewability standard. Payment is often based on upon what the advertiser tracks via their reporting platforms, and the publisher may not have access to this information. This means that the publisher may not have a reliable way to deliver against nor optimize against the viewability threshold.

In order for digital content publishers to try to deliver digital media campaigns in accordance with the plan's defined viewability threshold, there are not many easy options. Publishers will often contract with a data or measurement provider. The workflow is to then pull daily reporting to see how a campaign is performing. The publisher's ad operation team can then retarget the campaign based on the reporting to deliver to only those "highly viewable" ad positions. For example, going back to the 100,000 ad impression order discussed earlier that has to hit 70% viewable impressions, the workflow in the prior art would be as follows; after the first day of the campaign, a report can be pulled from the publisher's ad vendor and viewability vendor of choice. After correlating the data, the publisher's ad operations team may then go into their ad delivery platform and restrict this campaign from delivering to certain underperforming ad locations since its underperformance is lowering the aggregate viewability performance of the campaign.

However, there are numerous problems with this method since a publisher is using relatively old data to make future predictions. In addition, in the world of online media a particular web page may gain or lose audience in significant swings depending on the public's interest in the content presented on that site for any given day. In addition, if a top level section such as "News" has an average viewability of 70% but different page templates or specific articles perform better or worse, there would be limited ability for the publisher to get granular targeting due to limitations in reporting and ad serving technology.

This document describes methods and systems that are directed to solving at least some of the issued described above.

SUMMARY

In an embodiment, a system serves a digital content item, such as a digital advertisement, to an insertion field of a user interface, such as a web page, that is displayed on a client electronic device. The system include one or more servers that are configured to receive a service request for a user interface from a client electronic device. If the service request is for a web page, the service request may include a service address, and the system will serve the web page to the client device at the service address. If the service request is for a user interface of an electronic device application, the system will cause the application to generate and output the user interface on the display. The user interface will include an insertion field (such as an ad insertion field) that is located at a position on the user interface. The system may obtain, from a solution scoring file host, a viewability score for the ad insertion field. The viewability score will comprise a measurement of the viewability of the ad insertion field from previously-served instances of the user interface. The system will: (i) receive a request for insertion of a digital advertisement (or other content item) in the insertion field of the user interface; (ii) query a data store of digital advertisements/content items and select, from the data store, a digital advertisement/content item targeting a viewability parameter that is consistent with the viewability score for the insertion field; and (iii) serve the selected digital advertisement/content item to the client electronic device via the insertion field of the user interface.

In some embodiments, the system may include a solution scoring file host that determines the viewability score for the insertion field by: (i) detecting that a prior service request for the user interface has been received from an electronic device; (ii) associating a digital advertisement/content item with the insertion field; and (iii) receiving from the client electronic device an indicator of visibility of a window of a display device via which the client application is presenting the user interface while the digital advertisement/content item is associated with the insertion field. If the indicator of visibility indicates that the window is hidden, the system will continue querying the client application until either (a) the browser or other application returns an indicator of visibility that indicates that the window is not hidden, or (b) the digital ad/content item is no longer associated with the insertion field. After receiving an indicator of visibility that indicates that the window is not hidden, the system will query the client application to return a measurement of an amount of the insertion field that is being output by the display device.

In some embodiments, the measurement of the amount of the insertion field that is being output by the display device may comprise a number of pixels that are output, a percentage of the total number of pixels that make up the insertion field, or a ratio of the number of pixels that are being output to the total number of pixels that make up the insertion field.

In some embodiments, determining the viewability score for the insertion field may further comprise, if the measurement indicates that the amount is less than a threshold, continuing to query the client application to return the indicator of visibility until either (i) the amount equals or exceeds the threshold, or (ii) the digital ad/content item is no longer associated with the insertion field. If the measurement indicates that the amount equals or exceeds the threshold, the system may start a counter to measure a time that the digital advertisement/content item is displayed on the display device until either (i) the amount is less than the threshold, or (ii) the digital advertisement/content item is no longer associated with the ad insertion field.

In some embodiments, when selecting the digital advertisement having a viewability parameter that is consistent with the viewability score for the ad insertion field, the system may ensure that the digital advertisement has a viewability parameter of a value that is equal to or less than the viewability score for the ad insertion field. The system also may ensure that the digital advertisement has one or more targeting parameters that correspond to one or more audience parameters of the client electronic device.

Optionally, the one or more servers may manage a campaign that includes a time period, a set of digital advertisements, and an overall viewability threshold that comprises a measurement of viewability of all digital advertisements from the set that are served to client electronic devices over the time period. If so then when selecting the digital advertisement having a viewability parameter that is consistent with the viewability score for the ad insertion field the system may select a digital advertisement that is associated with the campaign so long as the viewability score for the ad insertion field will not cause a collective measurement of viewability of digital advertisements served in the campaign to drop below the overall viewability threshold. Otherwise, the system will select an alternative digital advertisement that is not associated with the campaign.

After serving the selected digital advertisement/content item to the client electronic device via the insertion field, the system may receive, from the client electronic device, a measurement of the insertion field that was output by the display device while the selected digital advertisement/content item was in the insertion field. The system may then update the viewability score for the insertion field based on the received measurement.

After serving a selected digital advertisement that was part of a campaign to a client electronic device via an insertion field, the system may receive, from the client electronic device, a measurement of the insertion field that was output by the display device while the selected digital advertisement was in the insertion field. It may then update the collective measurement of viewability based on the received measurement.

DETAILED DESCRIPTION

In this document, the singular forms "a," "an," and "the" include plural references unless the context clearly dictates otherwise. The term "comprising" means "including, but not limited to." Similarly, the term "comprises" means "includes, and is not limited to." Unless defined otherwise, all technical and scientific terms used in this document have the same meanings as commonly understood by one of ordinary skill in the art.

The terms "electronic device" and "computing device" refer to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity. Additional elements that may be included in electronic devices will be discussed below in the context of FIG. 5.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document the terms "viewability" and "viewability score" refer to a measurement of an amount of a digital advertisement that is visible on a display device for a defined period of time, and not positioned off-screen or obscured by another window of a different display or website that is also shown on the display at the time. Viewability may be measured in terms of pixels, in terms of a percentage or ratio of a total amount of available space or pixels, A "viewability parameter" is a target level of viewability of a digital ad or an ad campaign, such as a minimum viewability score for an ad or a minimum collective measurement of viewability for a group of ads a campaign.

Figure 1:
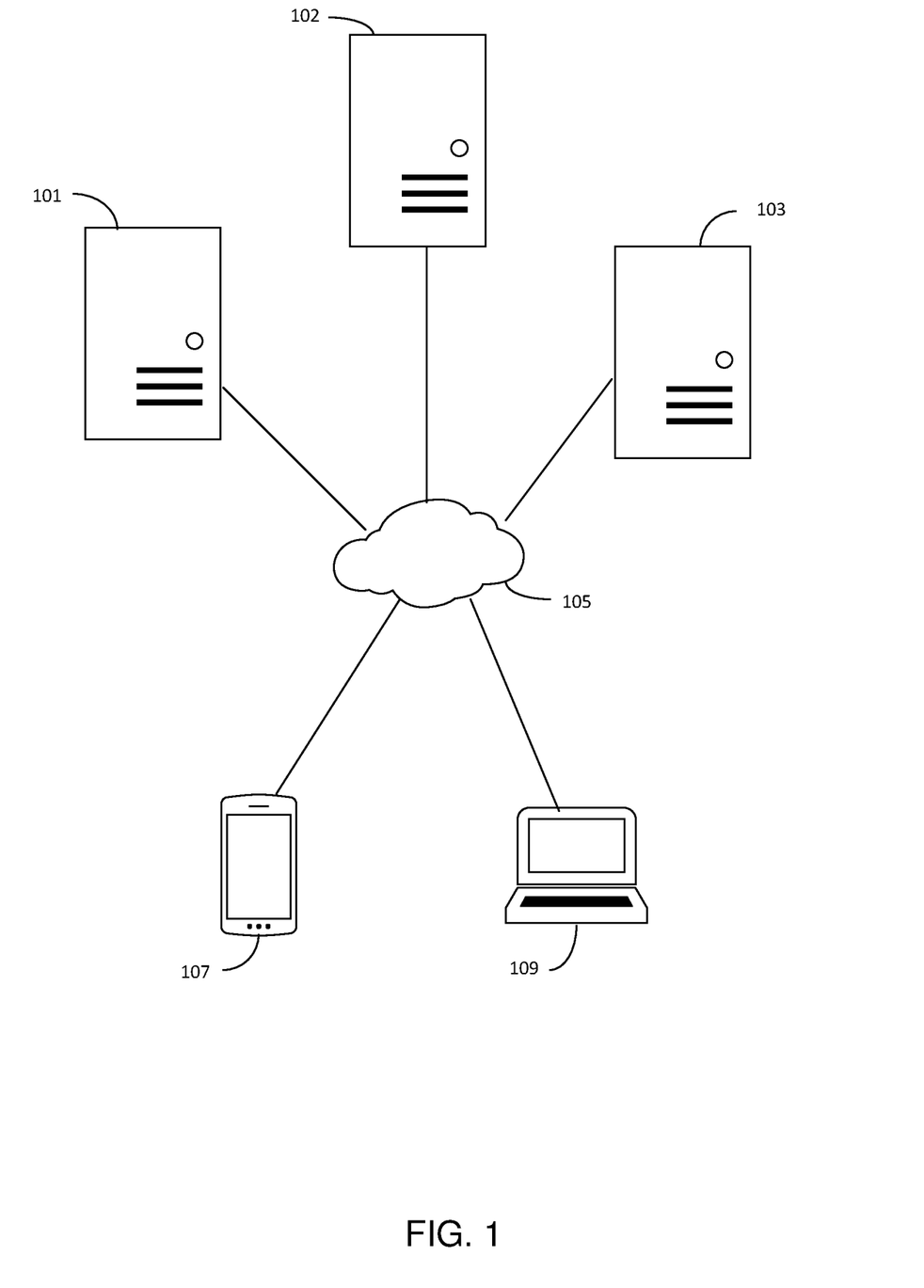
FIG. 1 illustrates example elements of a digital content delivery system.

FIG. 1 depicts example components of a system for serving user interfaces such as web pages, as well as associated digital advertisements, to various client electronic devices. The system may include a remote server such as web server 101 that includes a processor and computer-readable instructions that cause the processor to generate and serve web pages or other pages to various client electronic devices 107, 109 via one or more networks 105 such as the Internet. Alternatively, the client devices may include installed client applications that are configured to generate and output user interfaces having various screens on the client devices.

Each web page or other user interface may be generated by HTML or other code with one or more scripts that cause a portion of the web page to be an ad insertion field, which will call an ad server 102 to serve a digital advertisement to the ad insertion field. (Which the examples below disclose an ad server that serves digital advertisements, as discussed below a correspondent same system and method may include a digital content server that serves other digital content to insertion fields. Thus, the term "advertisement" when used represents an optional embodiment, and the invention includes embodiment in which the digital content is other than an ad.)

The ad server 102 and/or client device will include and/or have access to a data store of digital advertisements (in the form of electronic files), each of which is associated with one or more parameters as described below. A solution scoring file host 103 is a server that queries client devices after web pages are served or other user interfaces are output to determine viewability data for the web pages and their associated ad insertion spaces. The solution scoring file host 103, remote (web) server 101 and/or ad server 102 may be functional features of a single device, of two devices, separate devices or a distributed network of devices.

Figure 2:
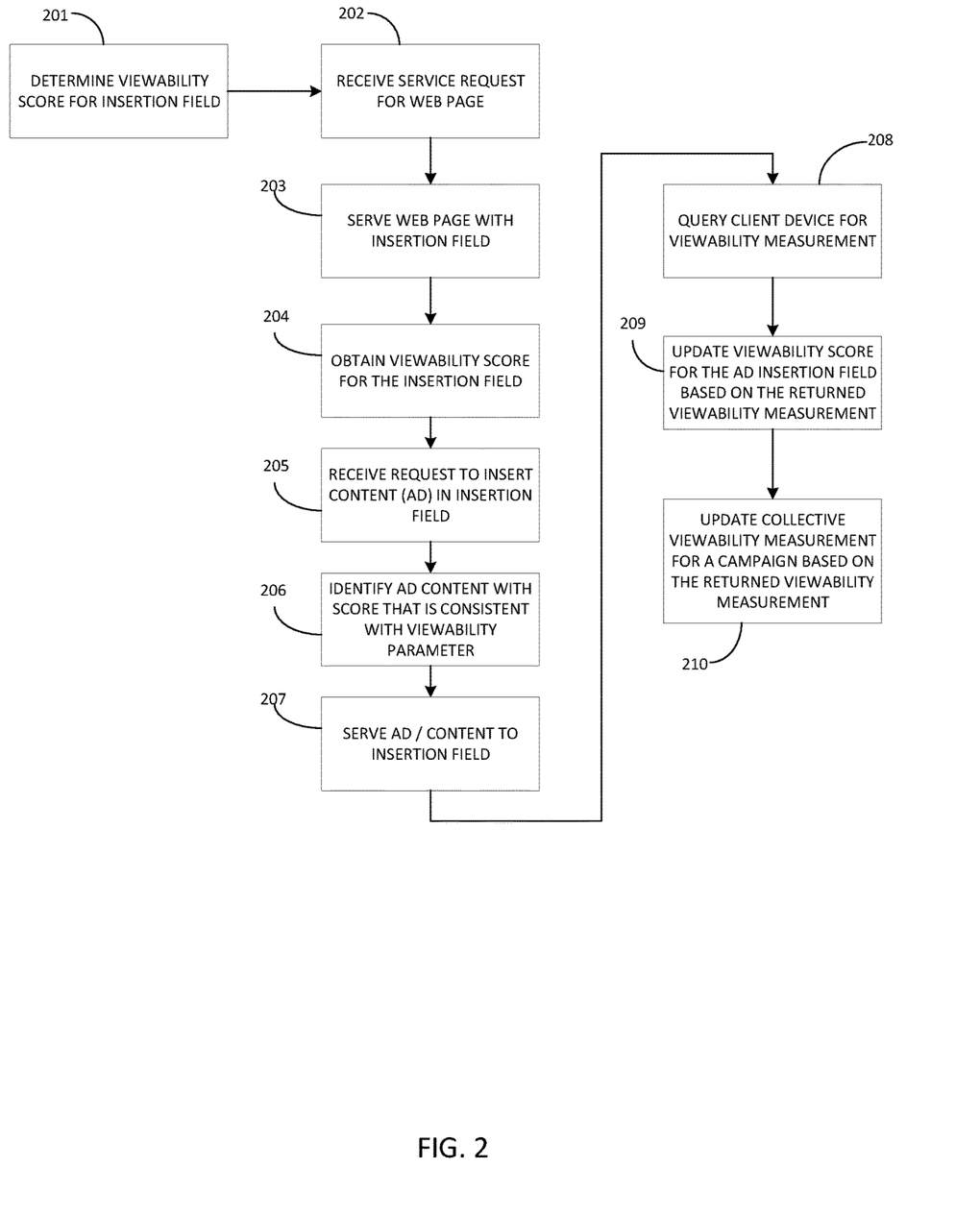
FIG. 2 illustrates an example process flow for selecting and serving digital advertisements in ad insertion fields of user interfaces such as web pages.

FIG. 2 is a flowchart describing various steps that the system may implement when serving digital advertisements to client devices, either individually or as part of a campaign. When a web server receives a service request for a web page from a client electronic device 202, it will cause the user interface (e.g., the web page) to be served 203 to the client device at a service address that is associated with the request. The request may come from a browser application, in which case the web page will be viewable in the client device's browser application. Alternatively, the request may come from a different application, such as a media player, a news service application or another software application, in which case the web page may not be a traditional web page that is viewable in any browser but which instead is a page or other structure that is viewable from within the software application that generated the request (i.e., a user interface page).

The user interface will include an insertion field (such as an ad insertion field) that is located at a position on the user interface. The ad insertion field may include a script that calls an ad server to deliver an ad at the position. However, before the ad server delivers the ad, web server or the ad server may have, or it may query a solution scoring file host for, a viewability score 204 for the ad insertion field of the web page. The viewability score is a measurement of the viewability of the ad insertion field from previously-served instances of the web page. The ad server will receive a request for insertion of a digital advertisement in the ad insertion field 205 and querying a data store of digital advertisements. The ad server will select, from the data store, a digital advertisement having a viewability parameter that is consistent with the viewability score for the ad insertion field 206. When selecting the digital advertisement, the system also may ensure that the digital advertisement is associated with one or more targeting parameters that correspond to one or more audience parameters of the client electronic device. A targeting parameter is a characteristic that corresponds to a characteristic that is stored in a profile of the client device or a user of the client device, such as a category that is a known category of interest to the device user. The ad server will then serve 207 the selected digital advertisement to the client electronic device via the ad insertion field.

Before selecting and serving any ad, one of the system's servers may determine a viewability score for the ad insertion field 201. The system may do this by retrieving the score from stored data or generating the score based on prior service requests for the user interface. To generate the viewability score, the system may associate a digital advertisement with the ad insertion field and serve the web page with the digital ad to a client device application, or otherwise cause the client application to generate and output the user interface. The system may then query the client application to return, or the client application may push to the system on its own, an indicator of visibility of a window of a display device via which the application is presenting the web page while the digital advertisement is associated with the ad insertion field. If the indicator of visibility indicates that the window is hidden, the system will continue querying the client application until either (i) the client application returns an indicator of visibility that indicates that the window is not hidden, or (ii) the digital ad is no longer associated with the ad insertion field. After receiving an indicator of visibility that indicates that the window is not hidden, the system will query the client application to return a measurement of an amount of the ad insertion field that is being output by the display of the client electronic device.

The measurement of the amount of the ad insertion field that is being output by the display device may be a number of pixels that are output, a percentage of the total number of pixels that make up the ad insertion space, a ratio of the number of pixels that are being output to the total number of pixels that make up the ad insertion field, or another suitable measurement. To determine the viewability score for the ad insertion field, if the measurement indicates that the amount is less than a threshold, the system may continue to query the client application to return the indicator of visibility or the measurement until either (i) the amount equals or exceeds the threshold, or (ii) the digital ad is no longer associated with the ad insertion field. If the measurement indicates that the amount equals or exceeds the threshold, the system may start a counter to measure a time that the digital ad is displayed in the ad insertion field on the display device until either (i) the amount is less than the threshold, or (ii) the digital ad is no longer associated with the ad insertion field.

Additional details of viewability metric determination will be described below.

Optionally, to identify a digital advertisement having a viewability parameter that is consistent with the viewability score for the ad insertion field, the ad server may, using viewability score data, select from the data store an ad having a viewability parameter of a value that is equal to or less than the viewability score for the ad insertion field.

Alternatively or in addition, the ad insertion activity may be part of a campaign. If so, then when selecting an ad and the ad server also may require that the presentation of the ad in a particular ad insertion field not cause a collective measurement of viewability for the campaign to drop below an overall viewability threshold. A campaign may include a number of data points, including a time period, a set of digital advertisements, and an overall viewability threshold that comprises a minimum acceptable measurement of viewability of all digital advertisements from the set that are served to client electronic devices over the time period. If so, then the ad server may identify an ad from a campaign to be placed into an ad insertion field but only do so if the digital advertisement has a viewability parameter that is consistent with the viewability score for the ad insertion field. In addition or alternatively, the ad server may only insert into the ad insertion field a digital advertisement that is associated with the campaign if the viewability score for the ad insertion field will not cause a collective measurement of viewability of digital advertisements served in the campaign to drop below the overall viewability threshold. Otherwise, the ad server will select an alternative digital advertisement that is not associated with the campaign, or another ad from the campaign that has a lower viewability parameter that is less than the field's viewability score.

After delivering an ad to a client electronic device via an ad insertion field, the system may query the client electronic device to return a measurement of the ad insertion field 208 that was output by the display device while the selected digital advertisement was in the ad insertion field. It may then update the viewability score for the ad insertion field based on the returned measurement 209, such as by calculating an average of the new measurement and all previous measurements for the ad insertion field. If the ad was part of a campaign, it may also update the collective viewability measurement for the campaign 210 based on the returned measurement, such as by calculating an average of the new measurement and all previous measurements for the campaign.

Determining Viewability Data:

When a client device navigates to a web page or opens a page (i.e., a screen) of an installed application, the system may measure viewability of ad insertion fields on that page. The page's code, optionally in the form of an array, will contain element IDs for one or more ad insertion fields on the web page. The names of the element IDs may be arbitrary from publisher to publisher. For example, a web page publisher may place this code onto a web page for use by the system. Alternatively, this code may exist in the application's code or within some other platform which has code on the page such as a tag manager, a head script wrapper, or as a server to server solution. In other words, the publisher or application developer may place this code onto their page, or the code may access the page via an intermediary platform. The ad insertion field codes can help the publisher to identify to the solution which HTML (or other code-based) elements the publisher has defined as ad spaces and therefore should be measured.

The web server or device on which the application is installed may access the solution's script library, which measures data and sends it to appropriate locations. The script loads the array of element IDs and then repeatedly checks the web page for the element ID to come into existence. A function within the script library may take each element ID from the array and loop through each name, checking to see if that element exists on the page's Document Object Model (DOM) (in embodiments where the script is Javascript). The purpose of this is to verify that the elements IDs (ad spaces) are in fact on the given web page before beginning the measurement process. Other verification methods may be used in other types of code sets.

Once the element is verified to have loaded, the system may examine the element to look for an ad platform code to load. This may be done by identifying the element that now exists and periodically checking to see if the element has contents. If contents exist and are consistent with what would be expected when an ad is present, then the periodic checking may be stopped and the script may continue to the next step. The purpose of this is to check that after the element that should contain an ad is found to be present, it should also have within it the code to render an ad from the ad platform before starting the viewability measurement.

Once the above has happened, the system may consider that the publisher-defined element exists on the page and that the element indeed contains ad platform code which has successfully initiated. The system may then confirm that the browser window is the foremost window on the site visitor's screen. (This document will use the term "browser" by way of example of a client application, but other software applications that are capable of displaying the page are included within the meaning of this term of the purpose of this disclosure.) Similarly, the term "web page" may include a browser-viewable web page, or a page that is formatted to be served by a server and displayed on a client device through a browser or a native application.) This check is done by querying a browser's inherent properties. If the visibility of the window is false or null, then the state of the browser will be periodically checked to see if this state changes in order to continue on through the measurement logic. If the window or browser tab is reported as visible by the web browser then the solution will continue on through the measurement logic. This step is completed by way of a function that periodically checks known popular web browsers' support for the native browser property of "hidden." If the property is equal to "hidden" then the script continues to periodically check to see if this state changes to not hidden before proceeding to the next step. If the property is set to "not hidden" then the system may presume that the browser window and or browser tab are foremost on the screen. The measurement process may continue, with the window state still periodically checked. If the window state changes from "not hidden" to "hidden," then the script may reset back to a state of waiting for the window visibility to be "not hidden" before doing additional viewability measurements. The purpose of this is to check that it is probable that the web site and the ad space on the web site have the opportunity to be seen since the browser window is not tabbed down and the browser tab is the selected tab. In order for the measuring process to continue the state of the browser window's visibility must always be "not hidden."

The system may then identify whether an ad is present within the publisher's element and the ad server's code nested within. When an ad loads, it is detectable through the existence of an additional nested object, for example, an iframe. However, different ad vendors may deploy different types of nested elements. A periodic task checks to see if a nested element exists within the contents of the DOM→element ID→ad server element. If the additional element does not exist then the periodic checks may continue until an element has been found. If an element exists then the system may assume that an actual ad has been delivered to the page by the ad server and the measurement process continues. The purpose of this is to ensure that viewability measurement does not start before an ad has loaded. Due to network latency and delays in the ad platform's ad selection process in addition to other page elements and scripts loading, it is possible that the ad loads out of sync with the rest of the content on the page. Measuring the viewability of an ad space that has not loaded an ad yet would pollute the recorded data therefore it may be desirable to wait for an ad to populate the ad space to help improve data accuracy.

Once the nested element has been detected, the system may query the browser's (or other application's native measurements for the (X and) Y ((left and right and) up and down) coordinate of the top left corner of the publisher's element that contains the ad, the (X and) Y of the browser's (vertical and horizontal) scroll bar, the height (and width) of the browser window, and the ad element's height, width, opacity, display styling, visibility styling, and offsetParent. These measurements may be used to detect any or all of the following: (i) where the ad is on the page's vertical (and horizontal) plane; (ii) where in the vertical (and horizontal) plane the application window is currently scrolled to; (iii) the height (and width) of the application window; (iv) the height of the ad; (v) the width of the ad; and (vi) whether the styling of the element or sub-elements containing the ad have been set to anything that would hide or prevent viewing of the ad. The system may take any or all of this data and compute the score as, for example the percentage of its pixels that are viewable within the application window. The purpose of this is to define if the ad is viewable or not.

Figure 3A:
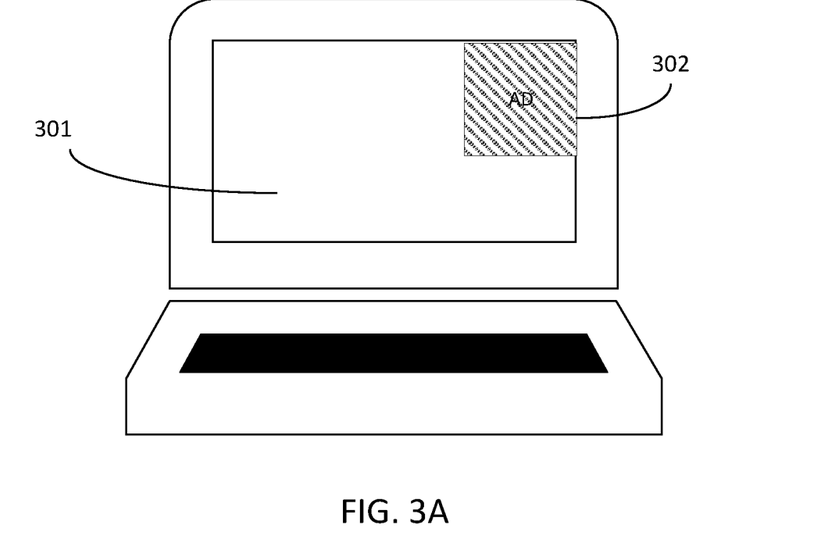
FIGS. 3A and 3B illustrate different levels of viewability of a digital ad on a user interface.
Figure 3B:
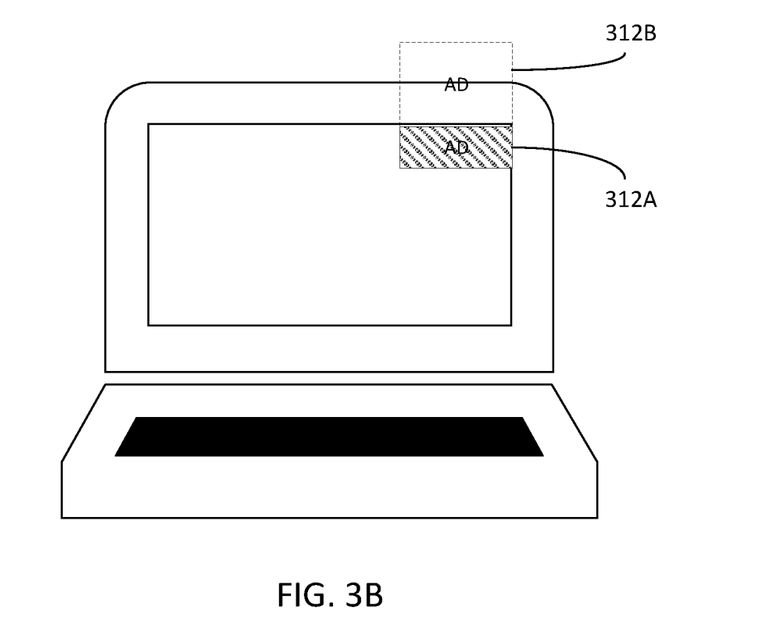

For example, as shown in FIG. 3A, if a web page 301 is 1000 pixels tall, the scroll bar is at the top most, the browser height is 1000 pixels, the ad insertion field 302 is 500 pixels tall and located 0 pixels from the top of the site then 100% of its pixels are in view, and it may be considered to be viewable. Therefore, the viewability score measurement can continue as a measure of viewability over time. Alternatively, as shown in FIG. 3B, if a viewability threshold is 50% and only about 40% of the ad insertion field 312A is viewable and the remainder of the field 312B is positioned off-screen, then this percentage may be less than the viewability threshold, and the ad may be considered to be not viewable, and the viewability score measurement will either not be determined or it will be determined to be zero until the ad insertion field becomes more viewable. Note: the example of FIG. 3 shows the web page and ad fields scrolling vertically. However, the systems can also work with pages that scroll horizontally, with ad fields moving off of the sides of the display.

While at least a threshold level of the ad insertion field is visible, a system counter runs. If for any detectable reason the ad is taken out of view, the counter is reset to zero and the solution continues to check if the ad comes back into view. If the counter reaches a certain threshold while the ad is viewable then the ad is considered to have been viewed. The purpose of this is to make sure that the ad has been viewable for a minimum amount of time. Most industry viewability standards require that a time component is part of the measurement. For example, a standard may require that at least 50% of the pixels are viewable for 1 consecutive second. The solution may count fractions of a second to detect whether during the second the viewable state of the ad changes. If viewability is true for all consecutive fractions of a second for an aggregate consecutive second then the ad insertion field may be considered as having been viewable.

Measured data may be temporarily stored in an array or other data structure. This data may include, for example, the ad's height, width, the publisher's element ID, an indicator of whether the ad was viewable for the threshold time or not, how much time the ad existed on the page, and how much time the ad was viewable. The solution may save this data to an array which will be formatted for ingestion by the solution's server and database. The purpose of this is to have the collected data queued for sending.

When the application is a browser and the page is a web page, the site visitor initiates a page unload event as detected by the browser (or at any such time that the system chooses), the data in the array may be sent to the solution's server for raw input into the database. This raw data may be in the form of a string which contains the following data: the host URL, the path of the URL, a client ID, the ad's height, the ad's width, the publisher's element ID, an indicator of whether the ad was viewable for the threshold period of time or not, how much time the ad existed on the page, and how much time the ad was viewable. This data may exist for each ad that was on the page that loaded within the element IDs defined by the publisher. By adding an event listener for the browser's native "unload" event (or when system so chooses) it will trigger the process of calling a URL belonging to the system. At that URL resides a script on the system's server that takes the incoming query string and puts it into the system's incoming data database. The purpose of this is to move the recorded viewability data from the website visitor's machine and into the system's database for processing.

Processing Viewability Data:

The system may analyze the viewability data using procedures such as those described below. After a page with an ad insertion field is viewed in a page view session, the client device may return data about each impression that happened on the page. This may be in the form of a string that is broken down into sub-parts and saved to an incoming data database. While parsing the string, the system may refine the data to exclude anomalies. Examples of anomalies may be incomplete data, data indicating that ads were rendered bigger or smaller than their defined size (in which case the system may adjust the data to match the defined size rather than simply deleting it), or clearing out unknown or out of range ad sizes. A server may then access the inbound data database and pull each new row of data from it. The data within the row may contain the query string. The query string may follow a consistent format of all viewability data from a particular page view separated into chunks of data which represent each ad position moved into a new database. The purpose of this is to move the raw viewability data from the incoming data database, validate that it is usable data, and then move it to the database which the ad server will use when selecting ads for insertion.

Before storing data in a permanent location, if the page is a web page the system may first determine whether any data has been previously recorded for the unique URL in order to differentiate, for example, nydailynews.com as an umbrella versus nydailynews.com as a singular unique place on the internet. If not, the system may simply classify this data as the first data set for this unique URL and ad position. However, if this unique URL has been seen previously, this new data may be aggregated together with previously recorded data. Regardless of the above outcome, the data is moved from the temporary validation database to the ad position database. The ad position database contains a unique row for every unique URL, ad position and ad size combination that have been processed as well as aggregating all of the metrics recorded for that specific combination. By taking each row of data from the temporary database and comparing that to all of the data in the ad position database, it can be determined if this is new or additional data. The purpose of this is to further refine the original data that was received by the solution and combine it with data that may have been collected in the past. Optionally, the system also may delete the oldest available data for a URL, or delete data having a date that is older than a threshold, to ensure that the data reflects current activity at the URL. A similar process may apply for individual pages of an application, which each page being treated to be the equivalent of a unique URL in the process described above.

Scoring Ad Insertion Fields:

Once the viewability data for an ad insertion is received, it can be used to determine the viewability score for the unique URL or the application page. An instruction set pulls together some or all the data for any given unique URL or application page that exists in the database and then looks at how many times the ad unit for a given size has existed versus how many times it has been viewable (i.e., viewable ad impressions versus non-viewable ad impressions). This creates a percentage or other measurement of viewability. For example, row 1 of the ad position database might be a 728×90 pixel sized ad at a unique URL. The scoring server will pull this row and see that there has been one total impression and one total viewable impression. Therefore the viewability will be 100%. Row 2 in the database might be a 300×250 pixel sized ad. It may have 100 total impressions and 50 total viewable impressions. Therefore, the viewability of row 2 would be 50%. The purpose of this is to look at all of the data in the ad position scoring database and assign a percentage of viewability to each position for which data exists.

For each percentage range, the system may assign a score. For example, a 100% viewable ad position may receive the score of A. A 90% score may be B, 80% C, 70% D, and so on. Other grading schemes and levels of granularity may be used. This score can then be used by the ad server for targeting. While a single-letter score is shown by example, raw viewability percentages could be used as well.

The scoring also may consider that if a given ad space and ad size have X viewability then it also qualifies for all ranges below that range. For example, if on a particular unique URL there is an ad unit at the top of the page which is 728×90 in size and it is viewable 70% of the time then it is also viewable 60, 50, 40, 30, 20 and 10 percent of the time. Therefore, the score for this example may include the set "D,E,F,G,H,I,J,K" where D=70% viewable, E=60%, F=50%, etc. The purpose of this is to inform the publisher's ad platform that this ad position at this given ad size (728×90) at this given unique URL is viewable 70% of the time. If an ad in the publisher's ad platform is set to achieve 50% viewability, then the ad server may deliver the ad to this ad position because 70% is higher than 50%. Alternatively, the system may select an ad having a viewability target at or closer to 70% and save the 50% ad for another (ad) location where the viewability score is closer to 50%.

The possible ad positions and ad sizes along with their respective scores may be added to a score file or a database entry that is unique to the URL that the ad impressions occurred on. The ad server may then use the score file or database entry when assigning ads (to) ad insertion fields of future page views on that (unique) URL or page. The scoring and saving may be done by the solution scoring file host, which may aggregate data by (unique) URL or page, ad position and/or ad size. Scores are applied and the resulting data is saved as an array or other file structure in association with the (unique) URL or page to which the scores belong. The purpose of this is so that when a page visitor browses to a web site or opens a page of an application, the scoring data that is available is specific to that very page. Once the scores are saved, these score can be ingested and used by the ad server to make ad delivery decisions based on viewability.

Figure 4:
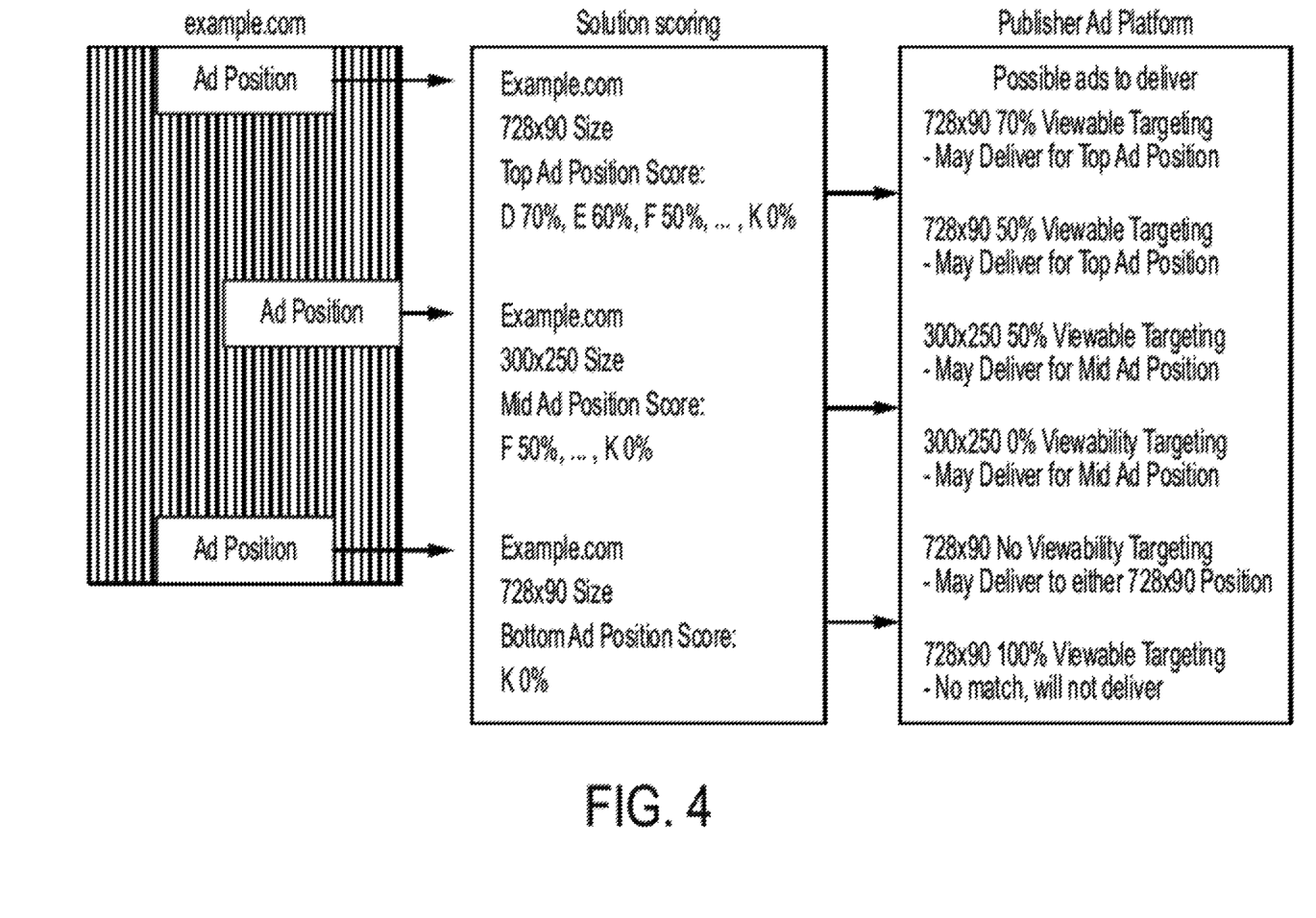
FIG. 4 illustrates an example of how various ad insertion fields may be scored, and how the scores may then be used to identify ads having viewability parameters that the scores will satisfy.

Passing Viewability Data to the Ad Server:

As noted above, an ad server may query the client device or solution scoring host to obtain scoring data. Alternatively, the system may, in some embodiments, include code on the web or application page that pushes the scores to the ad server. To target ads to viewability thresholds on subsequent visits to a unique page that has previously been scored, a set of code for the solution may be placed in the page's code (or the code may be initiated in some other way as described earlier) before the ad platform code which calls out to the scoring file. This code may cause the system to load the scoring data into an array which is then broken out for each ad position on the particular unique URL or page. This broken out data may be given to the ad platform as a set of key-value pairs or in another suitable format. When the ad platform begins to load its code, these viewability scores are ready for ingestion. The purpose of this is to allow the publisher's ad platform to become aware that it is about to serve ads to a specific URL or page in which the ad positions on the given page have unique viewability. This allows the ad platform to match ads that are targeted in the ad platform with the solution's scoring parameters to specific ad units that meet or exceed the needed viewability. FIG. 4 illustrates a few examples of viewability scores for a web page with three ad insertion fields, and viewability parameters that may be satisfied by the various fields' viewability scores.

Other Data Types:

While viewability data is the data that is described above, the process described above could be used to collect, score, and pass back to the publisher's ad platform many different types of metrics, including but not limited to: amount of time that the ad exists on page; amount of time ad is viewable; and amount of time that some portion of the ad is in-view.

Additionally, outside of measuring the viewability of ad insertion fields, the process can be applied to measure the viewability of other fields and content elements (such as articles, images and the like) on the page. For example, the viewability of a publisher's content could be measured and that data passed to the publisher's content management system. This could help guide placing other digital content (i.e., other than digital ads) dynamically based on the most viewable (or other metric) parts of the page. For instance, placing a breaking story or social feed in an insertion field (whether it be an ad insertion field or just a general digital content insertion field), on the page where viewability (or other metric) is the highest.

Also, when the scoring data is passed to the page in the form of an array, a publisher can ingest this data into their web analytics platform to gain further insight into how web page visitors interact with their site.

Additional Options:

The method of passing scores via a scoring file is a universal method which is platform and system agnostic. In using a file containing the scores, a publisher can write minimal code to ingest the scores into different platforms (e.g., ad platform, content management system, analytics, etc.). However, application programming interface (API) or server-to-server communication layers can replace the scoring file for more sophisticated or custom builds. However, as noted above the scores could also be contained in a database rather than a scoring file.

In some embodiments, a publisher may receive a request for proposal (RFP) from an advertiser for an ad campaign. An RFP may contain parameters such as the date(s) that the ad campaign should run, a maximum budget, and other criteria. The RFP also may include viewability targets for the campaign for certain ads within the campaign. For example, a campaign may call for a minimum 70% viewability for two ad sizes running for a period of one month. The RFP may ask how many ad impressions can be purchased within this budget while meeting this viewability parameter.

In the prior art the publisher would have no way to tell the advertiser how much 70% inventory (ad impressions) to sell. With the processes described in this patent document, the publisher may be given code to implement on its pages on their website. The code may include, for example: (i) head script which sets up arrays for scoring the publisher's ad units on that page; (ii) a call out to the page's scoring file if present; (iii) parameters for the ad server code on the page to ingest viewability scores; and (iv) a call to the scoring script (e.g., possibly in the footer). The publisher also may add key value pairs in their ad platform that match the scoring key values that will be coming from the page code. The system may then request 70% viewability for the campaign by assigning the 70% or better key value score to the order's ads, and the system may not deliver an ad to a URL or page or an ad insertion field of a URL or page if the URL, page or ad insertion field has a viewability score of less than 70%.

Alternatively, the publisher may assign the 70% or better threshold in the ad platform to a collective measurement of all of the campaign's ads as they are delivered. If so, then after each ad of a campaign is delivered the system will update the collective viewability measurement and only deliver an ad to a next ad insertion field if the viewability score of that ad insertion field would not, when factored into the collective measurement, cause the collective measurement to dip below 70%.

Figure 5:
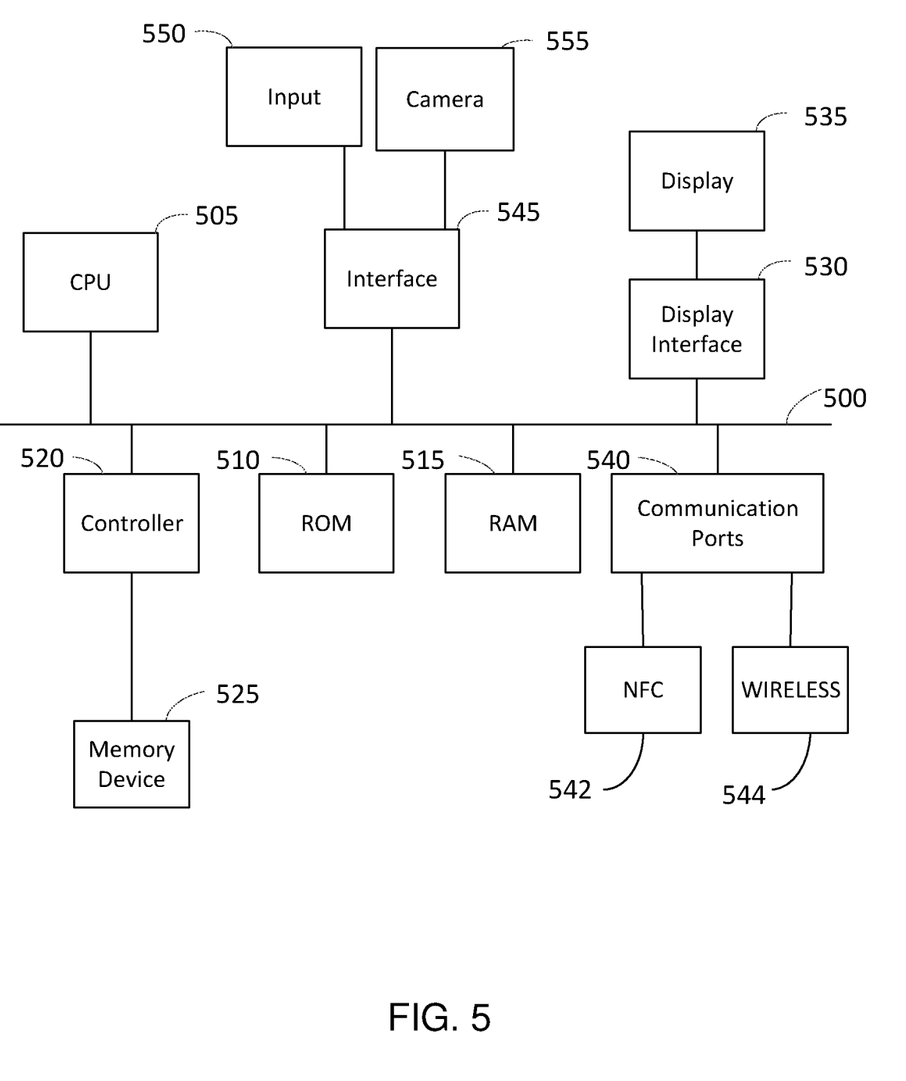
FIG. 5 illustrates example hardware components that an electronic device may include.

FIG. 5 depicts an example of internal hardware that may be included in any of the electronic components of the system, such as the user's client electronic device or any of the servers in the system. An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors, whether a central processing unit (CPU) or a graphics processing unit (GPU) or a combination of the two. Read only memory (ROM) 510, random access memory (RAM) 515, flash memory, hard drives and other devices capable of storing electronic data constitute examples of memory devices 525. A memory device may include a single device or a collection of devices across which data and/or instructions are stored. Data transfer to and from a memory device may be managed by a controller 520.

An optional display interface 530 may permit information from the bus 500 to be displayed on a display device 535 in visual, graphic or alphanumeric format. An audio interface and audio output (such as a speaker) also may be provided. Communication with external devices may occur using various communication devices such as a wireless antenna 544, an RFID tag and/or short-range or near-field communication transceiver 542, each of which may optionally communicatively connect with other components of the device via one or more communication ports 540. A communication device such as near-field communication transceiver 542 may be attached to a communications network, such as the Internet, a local area network or a cellular telephone data network.

The hardware may also include a user interface sensor 545 that allows for receipt of data from input devices 550 such as a keyboard, a mouse, a joystick, a touchscreen, a touch pad, a remote control, a pointing device and/or microphone. Digital image frames also may be received from a camera 555 that can capture video and/or still images.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of determining viewability of an ad insertion field of a user interface that is displayed on a client electronic device, the method comprising, by one or more servers:
communicating with a client electronic device that is outputting an instance of a user interface that is being served to a client application of the client electronic device by an ad server or web server, wherein the user interface includes a plurality of ad insertion fields;
identifying a first ad insertion field of the ad insertion fields that are included in the user interface;
querying the client application for the first ad insertion field to come into existence on the user interface;
determining that the first ad insertion field has come into existence on the user interface;
after determining that the first ad insertion field has come into existence on the user interface, determining whether code to render an ad has been loaded into the first ad insertion field; and
after the code to render an ad has been loaded into the first ad insertion field, determining a viewability score for the first ad insertion field.

2. The method of claim 1, further comprising:
receiving, from the client electronic device, an indicator of visibility of a window of a screen via which the user interface is being presented; and
if the indicator of visibility indicates that the window is hidden, continuing to query the client application until either (i) the client electronic device returns an indicator of visibility that indicates that the window is not hidden, or (ii) a digital advertisement is no longer associated with the first ad insertion field;
wherein determining the viewability score for the first ad insertion field comprises, after receiving an indicator of visibility that indicates that the window is not hidden, querying the client electronic device to return a measurement of an amount of the first ad insertion field that is being output by the screen.

3. The method of claim 2, wherein the measurement of the amount of the first ad insertion field that is being output by the screen comprises one or more of the following:
a number of pixels that are output by the screen;
a percentage of the total number of pixels that make up the first ad insertion field; or
a ratio of the number of pixels that are being output by the screen to the total number of pixels that make up the first ad insertion field.

4. The method of claim 2, wherein determining the viewability score for the first ad insertion field of the user interface further comprises:
if the measurement of the amount is less than a threshold, continuing to query the client electronic device to return the indicator of visibility until either (i) the measurement of the amount equals or exceeds the threshold, or (ii) the digital advertisement is no longer associated with the first ad insertion field; and
if the measurement of the amount equals or exceeds the threshold, starting a counter to measure a time that the digital advertisement is displayed on the screen until either (i) the measurement of the amount is less than the threshold, or (ii) the digital advertisement is no longer associated with the first ad insertion field.

5. The method of claim 1, further comprising, by the ad server or web server:
selecting a digital advertisement having a viewability parameter equal to or less than the viewability score for the first ad insertion field; and
serving the selected digital advertisement to the first ad insertion field.

6. The method of claim 5, wherein selecting the digital advertisement also comprises ensuring that the digital advertisement has one or more targeting parameters that correspond to one or more audience parameters of the client electronic device.

7. The method of claim 5, further comprising, by the ad server or web server:
managing a campaign that comprises:
a time period,
a set of digital advertisements, and
an overall viewability threshold that comprises a measurement of viewability of all digital advertisements from the set that are served to client electronic devices over the time period; and
wherein selecting the digital advertisement having a viewability parameter that is consistent with the viewability score for the first ad insertion field comprises:
selecting a digital advertisement that is associated with the campaign if the viewability score for the first ad insertion field will not cause a collective measurement of viewability of digital advertisements served in the campaign to drop below the overall viewability threshold, otherwise selecting an alternative digital advertisement that is not associated with the campaign.

8. The method of claim 1, further comprising, after a digital advertisement has been served to the client electronic device via the first ad insertion field of the user interface:
receiving, from the client electronic device, a measurement of the first ad insertion field that was output by a screen while the selected digital advertisement was in the first ad insertion field; and
updating the viewability score for the first ad insertion field based on the received measurement.

9. The method of claim 7, further comprising, after a digital advertisement has been served to the client electronic device via the first ad insertion field:
receiving, from the client electronic device, a measurement of the first ad insertion field that was output by a screen while the selected digital advertisement was in the first ad insertion field; and
updating the collective measurement of viewability based on the received measurement.

10. A system for determining viewability of an ad insertion field of a user interface that is displayed on a client electronic device, the system comprising:
a solution scoring file host server that comprises a processor, memory and programming instructions that are configured to cause the solution scoring file host server to:
identify a first ad insertion field,
query a client electronic device that is outputting a user interface that is served to a client application running on the client electronic device by an ad server or web server, wherein the user interface includes a plurality of ad insertion fields, to return an indication that the first ad insertion field has come into existence on the user interface,
after the indication is returned, determine that the first ad insertion field has come into existence on the user interface,
after determining that the first ad insertion field has come into existence on the user interface, determine whether code to render an ad has been loaded into the first ad insertion field,
after the code to render an ad has been loaded into the first ad insertion field, determine a viewability score for the first ad insertion field, and
send the viewability score to the ad server, web server or both.

11. The system of claim 10, wherein the solution scoring file host server further comprises additional programming instructions to:
receive, from the client electronic device, an indicator of visibility of a window of a screen via which the user interface is being presented; and
if the indicator of visibility indicates that the window is hidden, continue to query the client application until either (i) the client electronic device returns an indicator of visibility that indicates that the window is not hidden, or (ii) a digital advertisement is no longer associated with the first ad insertion field;
wherein the instructions to determine the viewability score for the first ad insertion field comprise instructions to, after receiving an indicator of visibility that indicates that the window is not hidden, query the client electronic device to return a measurement of an amount of the first ad insertion field that is being output by the screen.

12. The system of claim 11, wherein the measurement of the amount of the first ad insertion field that is being output by the screen comprises one or more of the following:
a number of pixels that are output by the screen;
a percentage of the total number of pixels that make up the first ad insertion field; or
a ratio of the number of pixels that are being output by the screen to the total number of pixels that make up the first ad insertion field.

13. The system of claim 11, wherein the programming instructions to determine the viewability score for the first ad insertion field of the user interface further comprise instructions to:
if the measurement of the amount is less than a threshold, continuing to query the client electronic device to return the indicator of visibility until either (i) the measurement of the amount equals or exceeds the threshold, or (ii) the digital advertisement is no longer associated with the first ad insertion field; and
if the measurement of the amount equals or exceeds the threshold, starting a counter to measure a time that the digital advertisement is displayed on the screen until either (i) the measurement of the amount is less than the threshold, or (ii) the digital advertisement is no longer associated with the first ad insertion field.

14. The system of claim 10, further comprising the ad server or the web server, wherein the ad server or web server comprises programming instructions to:
select a digital advertisement having a viewability parameter equal to or less than the viewability score for the first ad insertion field; and
serve the selected digital advertisement to the first ad insertion field.

15. The system of claim 14, wherein the programming instructions to select the digital advertisement also comprise instructions to ensure that the digital advertisement has one or more targeting parameters that correspond to one or more audience parameters of the client electronic device.

16. The system of claim 14, further comprising additional programming instructions that are configured to cause the ad server or web server to:
manage a campaign that comprises:
a time period,
a set of digital advertisements, and
an overall viewability threshold that comprises a measurement of viewability of all digital advertisements from the set that are served to client electronic devices over the time period; and
wherein the programming instructions to select the digital advertisement having a viewability parameter that is consistent with the viewability score for the first ad insertion field comprise instructions to:
select a digital advertisement that is associated with the campaign if the viewability score for the first ad insertion field will not cause a collective measurement of viewability of digital advertisements served in the campaign to drop below the overall viewability threshold, otherwise select an alternative digital advertisement that is not associated with the campaign.

17. The system of claim 10, wherein the solution scoring file host server further comprises additional programming instructions to, after a digital advertisement has been served to the client electronic device via the first ad insertion field of the user interface:
receive, from the client electronic device, a measurement of the first ad insertion field that was output by a screen while the selected digital advertisement was in the first ad insertion field; and
update the viewability score for the first ad insertion field based on the received measurement.

18. The system of claim 16, wherein the solution scoring file host server further comprises additional programming instructions to, after a digital advertisement has been served to the client electronic device via the first ad insertion field:
receive, from the client electronic device, a measurement of the first ad insertion field that was output by a screen while the selected digital advertisement was in the first ad insertion field; and
update the collective measurement of viewability based on the received measurement.

19. A method of determining viewability of an ad insertion field of a user interface that is displayed on a client electronic device, the method comprising, by one or more servers:
communicating with a client electronic device that is outputting an instance of a user interface that is being served to the client electronic device by an ad server or a web server, wherein the user interface includes a plurality of ad insertion fields;
identifying a first ad insertion field of the ad insertion fields that are included in the user interface;
querying the user interface for the first ad insertion field to come into existence on the user interface;
receiving, from the client electronic device, an indicator of visibility of a window of a screen via which the user interface is being presented;
in response to the indicator of visibility indicating that the window is hidden, continuing to query the user interface until either (i) the client electronic device returns an indicator of visibility that indicates that the window is not hidden, or (ii) a digital advertisement is no longer associated with the first ad insertion field; and
querying a solution scoring file host for a viewability score for the ad insertion field, wherein the viewability score comprises a measurement of the viewability of the ad insertion field from previously served instances of the user interface.

20. The method of claim 1, wherein determining whether code to render an ad has been loaded into the first ad insertion field comprises determining that the first ad insertion field has come into existence on the user interface before displaying a digital advertisement.

21. The method of claim 1, wherein determining whether code to render an ad has been loaded into the first ad insertion field comprises examining the contents of the first ad insertion field.

* * * * *